INVENTORS
WILLIAM A. CONAWAY
ARTHUR J. JOHNSON and
JOE SMISKO

Chisholm & Spencer
ATTORNEYS

United States Patent Office 3,421,843
Patented Jan. 14, 1969

3,421,843
PROCESS OF PREPARING BARIUM CARBONATE BY CARBONATION OF AQUEOUS BARIUM SULFIDE
William A. Conaway, Glendale, Arthur J. Johnson, Moundsville, and Joe Smisko, New Martinsville, W. Va., assignors to PPG Industries, Inc., a corporation of Pennsylvania
Filed May 5, 1965, Ser. No. 453,412
U.S. Cl. 23—66          13 Claims
Int. Cl. C01f 11/18

ABSTRACT OF THE DISCLOSURE

Finely-divided barium carbonate seed are prepared by rapid partial carbonation of an aqueous barium sulfide solution with carbon dioxide to precipitate barium carbonate seeds and to form barium hydrosulfide in solution. This slurry or fresh barium sulfide solution which has been seeded is carbonated with carbon dioxide to form reactive, free-flowing barium carbonate suitable for scum prevention in structural clay and hydrogen sulfide gas.

---

This invention relates to finely-divided alkaline earth metal carbonates, particularly barium carbonate. More particularly, the invention pertains to the preparation of highly reactive, finely-divided, free-flowing, barium carbonate particles of a high surface area and the use of such particles as seed in the manufacture of a highly reactive, free-flowing barium carbonate which is especially suitable for scum prevention in structural clay.

Among the prior art processes for the production of alkaline earth metal carbonates, U.S. Letters Patent 1,067,595 to Esktrom discloses a process whereby barium sulfide is reacted with $CO_2$ in a tank at 90° C. to produce $BaCO_3$.

U.S. Letters Patent 1,378,595 to MacMahon discloses a process wherein either BaS or $BaCl_2$ is reacted with $NH_4HCO_3$ to produce barium carbonate.

U.S. Letters Patent 1,615,515 to Marwedel et al. discloses the reacting of BaS with $Na_2CO_3$ to produce barium carbonate.

U.S. Letters Patent 1,640,652 to Falco teaches the reacting of BaS with oxalic acid to produce barium oxalate which is then heated to produce barium carbonate.

$$BaS + C_2O_4H_2 \rightarrow Ba(CO_2)_2 + H_2S$$

$$Ba(CO_2)_2 + heat \rightarrow BaCO_3$$

None of the aforementioned describe the preparation of a fine particle size carbonate, particularly by use of a seeding technique. Although U.S. Letters Patent 2,941,860 to Annis shows the preparation of a finely-divided calcium carbonate ($CaCO_3$) by a seeding technique, the patentee fails to teach the method by which the seeds are prepared.

According to U.S. Letters Patent 2,191,411 issued to Pierce, natural $BaCO_3$ has an average particle size of 2.53 microns and a specific surface area of 0.547 square meter per gram.

In accordance with the present invention, finely-divided log-shaped, free-flowing barium carbonate particles of a high reactivity and surface area are prepared in situ in a concentrated aqueous solution or slurry of barium sulfide by the reaction of a portion of the barium sulfide with $CO_2$ within a confined zone, the unreacted BaS and precipitated $BaCO_3$ then being passed to a second zone for the completion of the carbonation reaction with $CO_2$ and/or an alkali carbonate.

More particularly, an aqueous slurry or solution of barium sulfide (BaS) is reacted with gaseous $CO_2$ in a first zone for a period of time sufficient to convert and precipitate up to 50 percent of the soluble barium values to barium carbonate ($BaCO_3$) seed crystals as represented by the following over-all reaction:

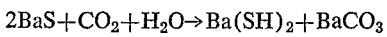
$$2BaS + CO_2 + H_2O \rightarrow Ba(SH)_2 + BaCO_3$$

Preferably the amount of $Ba(SH)_2$ and $BaCO_3$ are equal.

The use of $CO_2$ to precipitate finely-divided $BaCO_3$ seed particles is especially important having a material bearing on the nature of the precipitate. Thus, by using $CO_2$ instead of $Na_2CO_3$ or other carbonates, there is obtained $BaCO_3$ of decreased particle size, and of increased reactivity and flowability. Furthermore, the use of $Na_2CO_3$ or $K_2CO_3$ results in a loss of sulfur values, e.g., as $Na_2S$, NaSH, etc., whereas such loss is avoided by using $CO_2$.

The absorption of $CO_2$ by a BaS solution increases with pH of the solution. Since even a slightly dilute solution of BaS, e.g., around 3 percent, will have a normal pH of at least 12.0, the absorption of $CO_2$ within the first zone will be rapid and instantaneous. Such fast rate of absorption will continue until the reaction approaches 50 percent completion, at which point the pH will drop below 12.0. As the solution approaches a pH of 7.0, the absorption rate rapidly decreases.

The aqueous slurry of $Ba(SH)_2$ solution and $BaCO_3$ seeds may be passed to a second zone wherein the $Ba(SH)_2$ is converted to $BaCO_3$, preferably with additional $CO_2$.

Although a carbonate, particularly an alkali metal carbonate such as $Na_2CO_3$, may be used to complete the reaction in the second zone without affecting the particle size and reactivity of the product, such will inherently result in a sacrifice of hydrogen sulfide ($H_2S$) by-product. Thus, where $Na_2CO_3$ is used, all the sulfur values are lost as sodium sulfide.

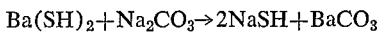
$$Ba(SH)_2 + Na_2CO_3 \rightarrow 2NaSH + BaCO_3$$

Although the sulfur values may be converted to $H_2S$ with an acid, such is costly and uneconomical in a commercial operation. Thus, in the preferred commercial embodiment, $CO_2$ is added to the $Ba(SH)_2$ in the second precipitation zone so as to generate $H_2S$ as a valuable by-product of the process. Usually the $CO_2$ is added in an amount sufficient to convert up to 95 percent by weight, preferably at least 98 percent, of the barium values, e.g., $Ba(SH)_2$, to barium carbonate. Sodium carbonate or other carbonate may then be added to complete the reaction and convert the remaining barium values to $BaCO_3$. More particularly, the precipitation is continued in the second zone with $CO_2$ until the pH of the seeded solution is 6.5 to 7.2, preferably below 7.0, at which point $Na_2CO_3$ is added until the reaction is close to 100 percent complete at a pH of 6.0.

Reference is made to the drawing and the figures thereon.

Figure 1:
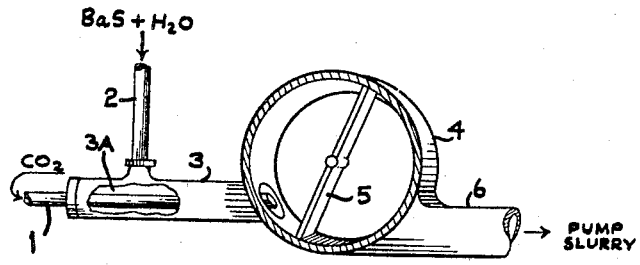
FIGURE 1 illustrates one embodiment of the first precipitation zone wherein the alkaline earth carbonate seeds are prepared.

More particularly, there is shown in FIGURE 1 a centrifugal pump 4 with an impeller 5. The pump suction is connected with concentric tubes 1 and 3. Annulus 3A formed by concentric tubes 1 and 3 is connected to tube 2. In the practice of this invention, an aqueous solution of barium sulfide is flowed through tube 2 to annulus 3A while $CO_2$ is simultaneously fed through tube 1. The BaS and $CO_2$ streams pass separately into the centrifugal chamber of pump 4 wherein the two streams are mixed together by impellor 5 and retained for a period of time sufficient to precitate the desired quantity and quality of carbonate seeds. The slurry containing barium carbonate seeds is then discharged through tube 6.

Although the invention has been illustrated with BaS flowing through tube 2 and $CO_2$ flowing through tube 1, such may be reversed whereby the BaS flows through tube 1 and $CO_2$ through tube 2.

Figure 2:
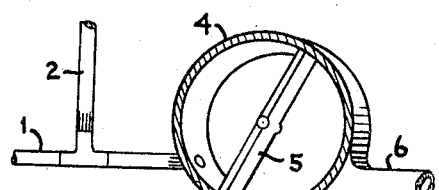
FIGURE 2 illustrates a further embodiment of the first zone.

In FIGURE 2, concentric tube 3 is omitted such that tubes 1 and 2 connect at an external point upstream of the pump 4, thus permitting a preliminary merging and mixing of the BaS and $CO_2$ streams. Again, it is a matter of choice as to whether the BaS is flowed through tube 1 or tube 2.

Figure 3:
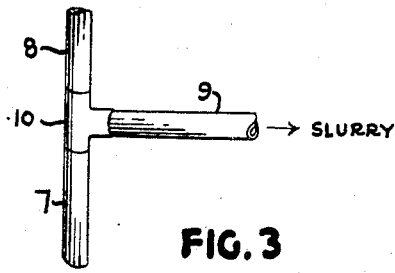
FIGURE 3 illustrates still a further embodiment of the first zone.

FIGURE 3 illustrates a T-tube arrangement wherein one stream, e.g., aqueous BaS, is flowed through tube 8 and the other stream, e.g., $CO_2$, is flowed through tube 7, the two streams merging, mixing and reacting in tubes 9 and 10 for a predetermined period of time. Tube 9 may be connected directly to a tank, e.g., for storage or further carbonation, prior to the intake of a centrifugal pump 4.

Figure 4:
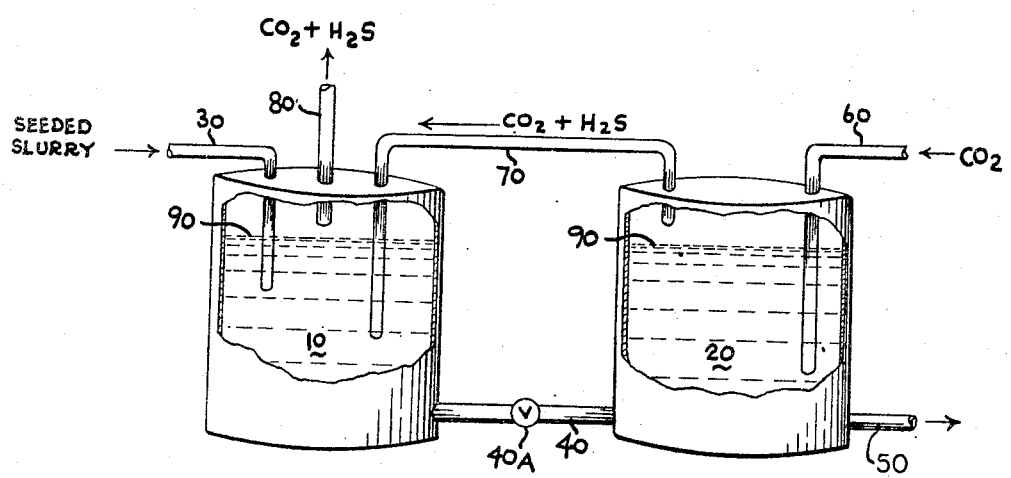
FIGURE 4 illustrates an embodiment of the second precipitation zone.

FIGURE 4 illustrates a continuous carbonation system for the final precipitation of barium values in the solution of the seeded slurry. More particularly, there is shown carbonation tanks 10 and 20, respectively, connected at the bottom by line 40 and valve 40A. Seeded slurry is introduced into tank 10 via line 30 where the final carbonate product is withdrawn from tank 20 via line 50. $CO_2$ is supplied to tank 20 via line 60, the $CO_2$ being introduced below the slurry level 90 such that it bubbles upwardly through the slurry. Unreacted excess $CO_2$ and evolved $H_2S$ gas pass from the top of tank 20 and flow via line 70 to tank 10, the $CO_2$ and $H_2S$ being introduced below the slurry level 90 in tank 10. Excess $CO_2$ and $H_2S$ gas are then withdrawn through vent line 80 and further processes, e.g., separated such as in an absorption column utilizing hot potassium carbonate or an ethanol amine for the absorption of $CO_2$. Preferably, the process is operated such that all of the $CO_2$ is absorbed and reacted with the slurry in tank 10 and such that the gas emitted from vent 80 is at least 95 percent by weight $H_2S$. Although FIGURE 4 has been discussed as comprising a continuous carbonation process, it equally may comprise a batch carbonation, e.g., a single tank. Generally, however, batch carbonation is not desirable in a commercial operation because of control problems in particle growth.

In still another embodiment of this invention, aqueous BaS feed is first passed through a first zone, e.g., as shown in FIGURES 1 to 3, at a low temperature, e.g., below 40° C., preferably 25 to 35° C., and at a concentration of 4 to 20 percent by weight. The resulting seeded slurry is passed through a second zone which can be the same or similar to the first zone, such as a centrifugal pump, and then to a third zone comprising either a batch or continuous carbonation tank.

In still a further practice, the seeded slurry from the first zone is mixed with a higher concentration BaS solution, e.g., 15 to 24 percent by weight. The mixture of slurry and solution is passed to a second zone which may comprise either a pump, T-tube, tank, or similar arrangement, and finally to a third zone The temperature of the second and third zones may be higher than the first zone, e.g., up to 70 to 90° C., respectively. However, the lower the temperature, the finer will be the $BaCO_3$ particles.

The average particle size and pigmentary properties of the $BaCO_3$ seed particles precipitated in the first zone will be a function of the temperature of the BaS solution. Thus with an increase in temperature, the particle size will increase, the reactivity will decrease, the surface area will decrease, and the seeds will be less free-flowing. In subsequent zones, the size of the particles is controlled by the size of the seeds fed to the zone and the temperature at which the precipitation is conducted.

The feed solution or slurry is retained in the first zone for a period of time sufficient to precipitate out the desired quantity of seeds. Such is conveniently referred to as the effective retention time or the over-all empirical contact time. The over-all empirical contact time is calculated from the pump volume (assumed to be filled with solution and seeds) divided by the rate of flow of the solution. In the practice of this invention the retention time in the first zone is less than 60 seconds, generally under 30 seconds, preferably about 0.01 to 10.0 seconds.

The quantity of seed precipitated in the first zone is up to 50 percent by weight of the precipitated soluble barium values, e.g., up to 20 percent by weight of the resulting slurry, preferably 2 to 17 percent. For a given seed surface area, an increase in the number and quantity of seeds in the slurry will increase the surface area of the $BaCO_3$ precipitated in subsequent zones. Thus the smaller the seeds and the larger the quantity, the smaller will be the $BaCO_3$ precipitated in the second zone.

When precipitated at a temperature below 40° C., the $BaCO_3$ particles have a specific surface area of at least 14.0, usually 17.0 to 30.0, square meters per gram as determined by the Brunauer-Emmett-Teller method described in Journal of the American Chemical Society, volume 60, page 309 (1938).

Where the seeded slurry is to be further instantaneously reacted with $CO_2$ by recycling back to the first zone or flowing through a second zone similar to the first zone, the precipitated seeds should have a specific surface area of 10.0 to 14.0 square meters per gram such that the seeds precipitated upon recycle or in a separate zone have a specific surface area of at least 16.0 square meters per gram. It has been found that increased surface area of the particles precipitated in the second zone is not correspondingly obtained with an increase in the surface area of the seeds forwarded from the first zone above 14.0. Thus the optimum specific surface area in the first zone has been found to be about 14.0, there being no corresponding increase of particle surface area in the second zone when the first zone seeds exceed 14.0.

The log-shaped barium carbonate particles precipitated at 40° C. or below in the first zone have a maximum length of 0.3 micron, usually below 0.2, and a maximum mean diameter of 0.1 micron, usually below 0.05. Ideally the particles have a length of 0.05 to 0.15 micron and a diameter of 0.02 to 0.06 micron.

The final barium carbonate product prepared from the seeded slurry by carbonation in a tank, e.g., FIGURE 4, has a surface area of 0.5 to 12 square meters per gram and a particle size of 0.2 to 4 microns.

The structural clay reactivity of the barium carbonate seeds from one or more zones should be less than 9.0, usually 7.0. The structural clay reactivity of the resulting barium carbonate product prepared from the seeded slurry is less than 10.0, usually less than 9.0.

The structural clay reactivity of barium carbonate as employed herein is defined as the ability of a given amount of the $BaCO_3$ seeds or product to prevent scumming of a given amount of structural clay containing soluble sulfates, e.g., $CaSO_4$. Thus as wet brick or tile is dried, the $CaSO_4$ migrates to the surface along with the water and reacts with the clay during the final firing cycle to produce an undesirable white scum on the brick surface. It is well known that if $BaCO_3$ is added to the wet clay, it will prevent scum formation according to the reaction:

$$CaSO_4 + BaCO_3 \xrightarrow{(H_2O)} CaCO_3 + BaSO_4$$

Both BaSO$_4$ and CaCO$_3$ are highly insoluble and cannot ionically migrate to the brick surface. However, because BaCO$_3$ is not 100 percent reactive it is necessary to add it in excess of the stoichiometric amount, for example, as shown in U.S. Letters Patents 1,576,558; 1,583,903, and 1,878,887. The amount of BaCO$_3$ added in excess of the stoichiometric amount is a measure of the reactivity of the BaCO$_3$; that is, the less BaCO$_3$ added, the more reactive it is.

Thus, as specifically used herein, structural clay reactivity is defined as the number of pounds of BaCO$_3$ required to prevent scumming in one ton of structural clay.

Structural clay as employed herein is defined as a mixture consisting of 90 percent by weight Kentucky Clay and 10 percent by weight Texas Clay. The analysis of each clay is given in Table I below.

TABLE I.—CLAY ANALYSIS

| Element [1] | Kentucky clay (percent) | Texas clay (percent) |
| --- | --- | --- |
| SiO | 54.00 | 60.00 |
| Al$_2$O$_3$ | 19.00 | 18.85 |
| Fe$_2$O$_3$ | 5.70 | 3.56 |
| TiO$_2$ | 1.66 | 2.11 |
| CaO | 12.53 | 3.96 |
| MgO | 1.92 | 1.51 |
| Na$_2$O | 0.93 | 0.62 |
| K$_2$O | 3.77 | 0.67 |
| CO$_3$= | 8.46 | 0.11 |
| S | 0.16 | 0.48 |
| H$_2$O Total | 1.70 | 4.60 |
| SO$_3$=(soluble) | 0.07 | 0.91 |
| Insolubles | 9.28 | 10.21 |
| Surface area (m.$^2$/g.) | 5.36 | 44.6 |
| Minerals (x-ray) | Quartz Chlorites Illites Muscovite | Quartz Illites |

[1] Calculated as oxides.

The reactivity of the seeds and product may also be expressed as a function of its reactivity with CaSO$_4$.

Since the reaction of CaSO$_4$ and BaCO$_3$ is ionic and the products are insoluble in water, the number of ions remaining in solution at a given time is a direct function of the degree to which the reaction has gone to completion. Thus BaCO$_3$ reactivity can be determined by measuring the number of ions in solution, that is, by measuring the conductivity of the solution.

Calcium sulfate (CaSO$_4$) reactivity as employed herein is defined as the ratio of the change in conductance for a given BaCO$_3$ sample with respect to the change for a standard BaCO$_3$ sample.

More particularly, 500 milliliters of an aqueous solution containing 1.1038 grams of CaSO$_4$ per liter is reacted for 15 minutes at 25° C. with 1.0 gram of BaCO$_3$ employing constant stirring. The change in conductance after 15 minutes is then divided by the change in conductance for a standard BaCO$_3$ sample having a diameter of 1.9 microns, and then multiplying by 100.

$$\frac{\Delta L\ \text{sample}}{\Delta L\ \text{standard}} \times 100 = \text{CaSO}_4\ \text{reactivity}$$

The calcium sulfate reactivity of the barium carbonate seeds from one or more zones should be at least 300, usually above 400. The product prepared from such seeds has a calcium sulfate reactivity of at least 10, usually in excess of 200.

Mean particle size dimensions of the BaCO$_3$ can be determined by counting and measuring the particles on an electron micrograph, and taking the mean.

Reference is made to the following examples.

EXAMPLE I

Apparatus and equipment was employed as shown in FIGURE 1. Centrifugal pump 4 comprised a centrifugal chamber having a volume of 50 milliliters and an impeller 5, both the chamber and the impeller being made of polyethylene. The pump was powered by a $\frac{1}{35}$ horsepower motor rated at 3000 revolutions per minute (Gorman-Rupp Industries, Belleville, Ohio).

An aqueous solution at 40° C. containing 8 percent by weight barium sulfide (BaS) was flowed through tube 2 at the rate of 500 grams per minute into the annulus of concentric tube 3 while 3.3 liters per minute of carbon dioxide (CO$_2$) at 25 to 30° C. and atmospheric pressure were flowed through tube 1, such that the BaS solution and CO$_2$ were separately injected into the centrifugal chamber of pump 4. The pump impeller 5 served both to agitate and to expel the resulting slurry through the discharge 6.

The slurry was collected and weighed. Seeds of barium carbonate (BaCO$_3$) were filtered from the slurry, washed, dried at 110° C., and ground in a Waring Blendor. An assay of a sample of the seeds gave 98.2 percent by weight BaCO$_3$, 0.14 percent by weight acid insoluble, 0.36 percent by weight total sulfur, and 0.32 percent by weight reducible sulfur. The yield of BaCO$_3$, basis the original BaS, was 40 percent.

The BaCO$_3$ particles were white, finely-divided particles containing agglomerates. A screen analysis was made with results shown in Table II below.

TABLE II

| Mesh size: | Percent by weight retained |
| --- | --- |
| +20 | 6.7 |
| −20, +35 | 2.9 |
| −35, +60 | 4.2 |
| −60, +100 | 17.6 |
| −100, +200 | 31.7 |
| −200 | 36.9 |

The barium carbonate seeds had a surface area of 22.0 square meters per gram, a calcium sulfate (CaSO$_4$) reactivity of 494, and a bulk density of 60 pounds per cubic foot.

The seeds also had very good flowability as evidenced by an electronic micrograph (FIGURE 5) which revealed small log-like particles having an average ultimate size of about .04 (mean diameter) by 0.10 (mean length).

EXAMPLE II

The equipment of Example I was employed. An aqueous solution of 8 percent by weight barium sulfide at 40° C. was flowed at 400 grams per minute through tube 2 and 4.9 liters per minute of CO$_2$ at 25 to 30° C. and atmospheric pressure were flowed through tube 1.

The barium carbonate yield was 45 percent with a surface area of 18.0 square meters per gram. The barium carbonate had a very good flowability as evidenced by an electron micrograph which again revealed small log-like particles the same as in Example I.

EXAMPLE III

The equipment of Example I was employed. An aqueous solution of 8 percent by weight barium sulfide at 30° C. was flowed at 300 grams per minute through tube 2 and 3.5 liters per minute of CO$_2$ at 25 to 30° C. and atmospheric pressure were flowed through tube 1.

The barium carbonate yield was 48.0 percent with a calcium sulfate reactivity of 411. The flowability of the barium carbonate was very good as evidenced by an electron micrograph which revealed small log-like particles the same as in Examples I and II.

EXAMPLE IV

The equipment of Example I was employed. An aqueous solution of 8 percent by weight barium sulfide at 80° C. was flowed at 490 grams per minute through tube 2 and CO$_2$ was flowed at 3.6 liters per minute at 25 to 30° C. and atmospheric pressure through tube 1.

The resulting barium carbonate yield was 36 percent with a calcium sulfate reactivity of 285. Flowability was poor as compared to the products of Examples I, II, and III. Although an electron micrograph (FIGURE 6) revealed log-like particles, the particles were large in comparison with those of Examples I, II, and III, the average particle size being about 0.1 (mean diameter) by 0.3 (mean length) micron.

EXAMPLE V

The equipment of Example I was employed. An aqueous solution of 12 percent by weight barium sulfide at 40° C. was flowed at 488 grams per minute through line 2 and $CO_2$ at 25 to 30° C. and atmospheric pressure was flowed at a rate of 5 liters per minute through tube 1.

The resulting barium carbonate yield was 30 percent with a calcium sulfate reactivity of 353 and a surface area of 14.8 square meters per gram. Flowability was good as evidenced by an electron micrograph (FIGURE 7) which revealed log-like particles slightly wider and longer than those of Examples I, II, and III, but smaller in size in comparison with the log-like particles of Example IV.

EXAMPLE VI

The equipment of Example I was employed. An aqueous solution of 18 percent by weight barium sulfide at 60° C. was flowed at 445 grams per minute through line 2 and 6.1 liters per minute of $CO_2$ at 25 to 30° C. and atmospheric pressure were flowed through tube 1.

Resulting barium carbonate yield was 27 percent with a calcium sulfate reactivity of 264 and a surface area of 6.1 square meters per gram. The flowability was poor as evidenced by an electron micrograph (FIGURE 8) which showed a very much larger mean particle size than those of Examples I to III with an almost complete absence of log-shaped particles.

EXAMPLE VII

The equipment of Example I was employed. An aqueous slurry of 18 percent by weight BaS at 30° C. was passed through the pump at 490 grams per minute with 4.2 liters per minute of $CO_2$ at 25 to 30° C. and atmospheric pressure.

$BaCO_3$ yield was 27 percent with a surface area of 11.7 square meters per gram.

An aqueous slurry of 18 percent by weight BaS at 30° C. was passed through the pump at 400 grams per minute with 4.2 liters per minute of $CO_2$ at 30° C. and atmospheric pressure.

The resulting slurry of $Ba(SH)_2$, BaS and $BaCO_3$ was passed a second time through the pump at 30° C. and 400 grams per minute. The $CO_2$ flow and temperature were the same as for the first pass.

The total $BaCO_3$ yield for both passes was 31 percent with a mean surface area of 16.8 square meters per gram and a calcium sulfate reactivity of 429. The flowability was good for each pass.

The results of Examples I to VII are summarized in Table III.

EXAMPLE VIII

The T-tube apparatus of FIGURE 3 was employed. The arms of the T-tubes 7 and 8 were two millimeter diameter glass tubes extended from a vacuum stop cock. Tube 9 was a four foot section of glass tubing, three millimeters in internal diameter, position at the exit end of the T-tube vacuum stop cock. The tube 9 emptied into a slurry collection flask.

An aqueous solution of 15.6 percent by weight barium sulfide (BaS) at 60 to 65° C. was flowed through arm 7 at 152 grams per minute. Carbon dioxide was flowed through opposite arm at 70° F. and atmospheric pressure at a rate of 0.385 liter per minute.

The slurry which exited from the end of tube 9 consisted of small stream indicating a completed absorption of $CO_2$. The slurry was weighed, filtered, washed, and dried as in Example I. Eleven percent of the barium sulfide was reacted and 100 percent of the $CO_2$ was reacted. The surface area of the barium carbonate seeds was 7.5 square meters per gram with good flowability.

The above conditions were repeated using the centrifugal pump set up of Example I. The surface area was 7.9 square meters per gram with good flowability thereby establishing that little difference exists between the centrifugal pump and T-tube methods.

EXAMPLE IX

The equipment of Example I was employed. An aqueous solution of 10.0 percent by weight of barium sulfide at 35 to 38° C. was flowed at 254 grams per minute and $CO_2$ at 25 to 30° C. and atmospheric pressure flowed at 3.8 liters per minute. The slurry was collected and 836 grams of the slurry added to 2590 grams of a 13 percent by weight barium sulfide solution.

The resulting slurry mixture was then passed through a second centrifugal pump (the same as pump 4) at a flow rate of 264 grams per minute with a separate stream of carbon dioxide at 3.8 liters per minute, each stream having a temperature of 70° C.

The slurry from the second pump was subjected to continuous carbonation with $CO_2$, e.g., as in FIGURE 4, for 3 hours. A summary of results is shown in Table IV.

TABLE IV

| | Temperature (° C.) | Percent yield, $BaCO_3$ | Surface area m.²/g. |
|---|---|---|---|
| First pump product | 35–38 | 7.7 | 12.4 |
| Second pump product | 70 | 46.2 | 11.2 |
| Batch carbonation | 70 | 99.0 | 5.5 |

An electron micrograph showing free-flowing log-shaped particles similar to Example I for the first pump product and similar to Example V for the second pump product. The precipitated barium carbonate from the second carbonation zone also showed good flowability.

From Table IV, it is seen that high surface area and flowability can be obtained for seeds precipitated at a higher temperature, e.g., above 60° C., by first precipitating a portion of the seeds at a low temperature.

EXAMPLE X

One thousand (1000) grams of the seeded slurry from Example I were batch precipitated at 35° C. in a one liter tank. Carbon dioxide at 25 to 30° C. and atmospheric pressure were flowed at 35 liters per minute, through a tube extending below the slurry surface such that the $CO_2$ bubbled upwardly through the slurry. The slurry was continuously agitated. The $CO_2$ flow was continued until the pH of the slurry leveled off at 6.0 thereby ensuring that

TABLE III

Figure 5:
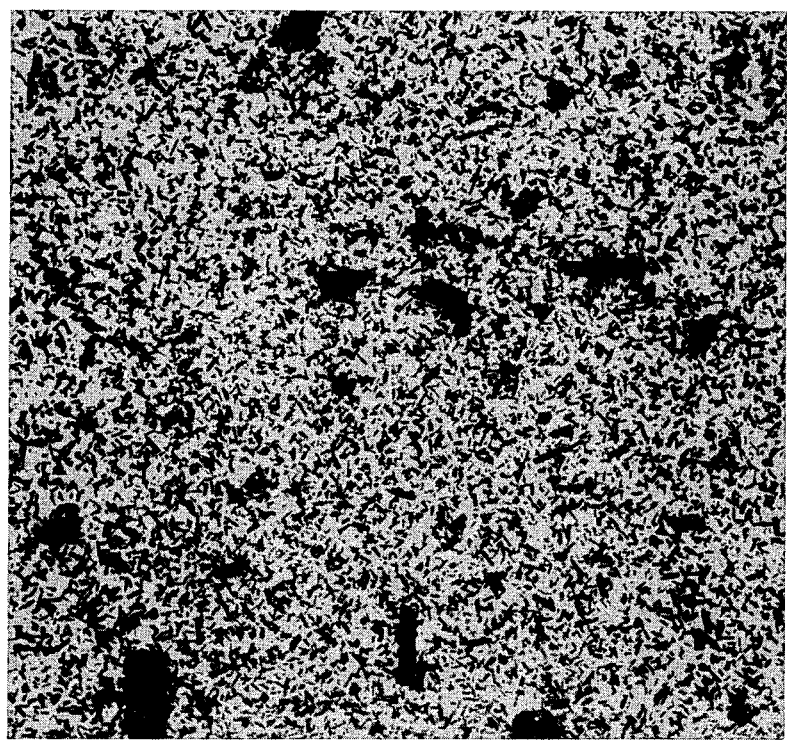
FIGURES 5 to 10 represent electron micrographs of various $BaCO_3$ samples as prepared in the examples. Each electron micrograph was taken at a magnification of 3465.
Figure 6:
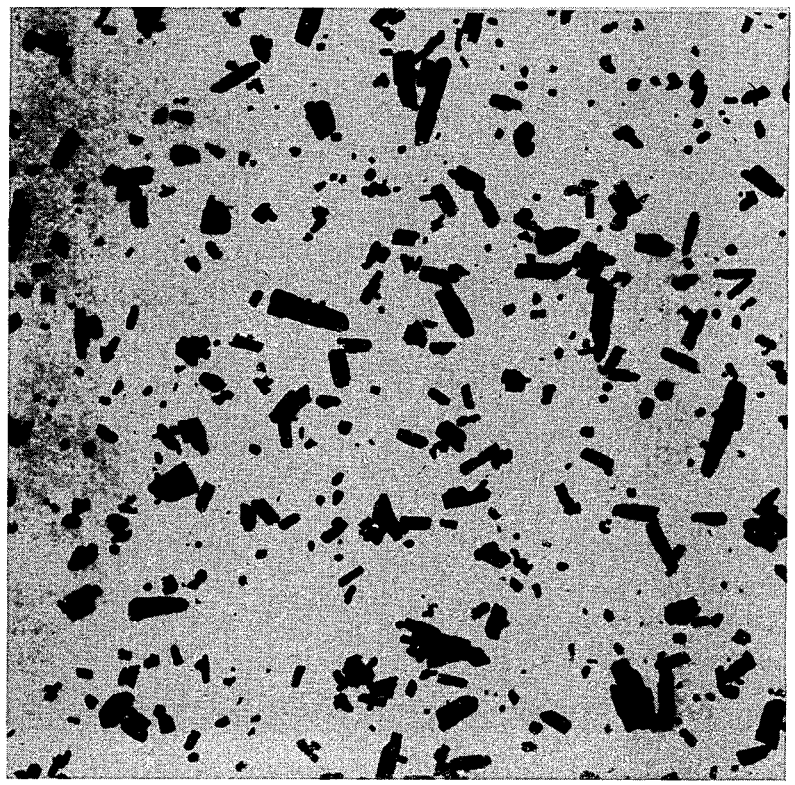
Figure 7:
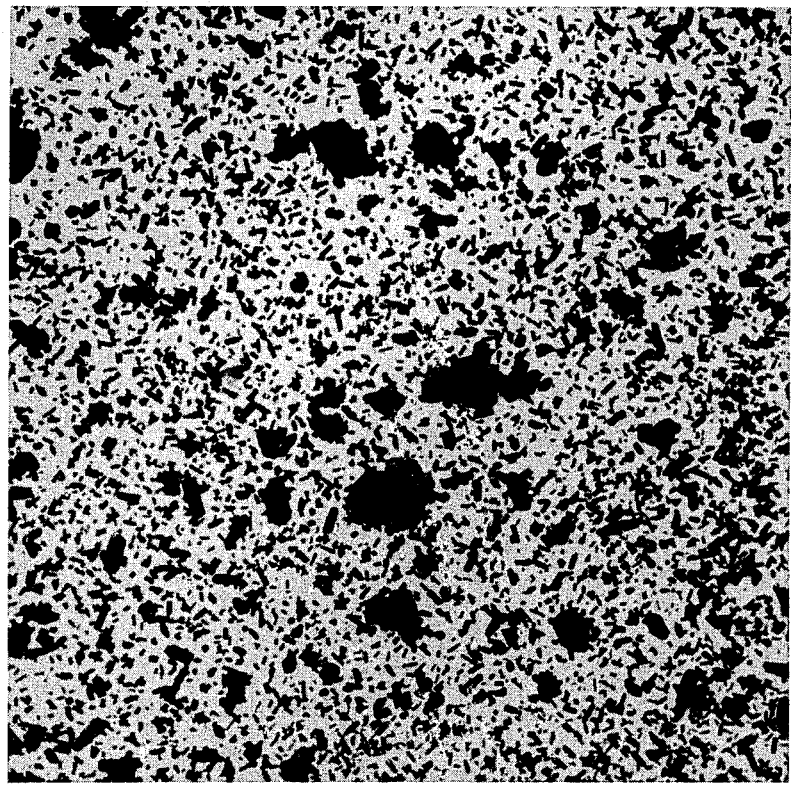
Figure 8:
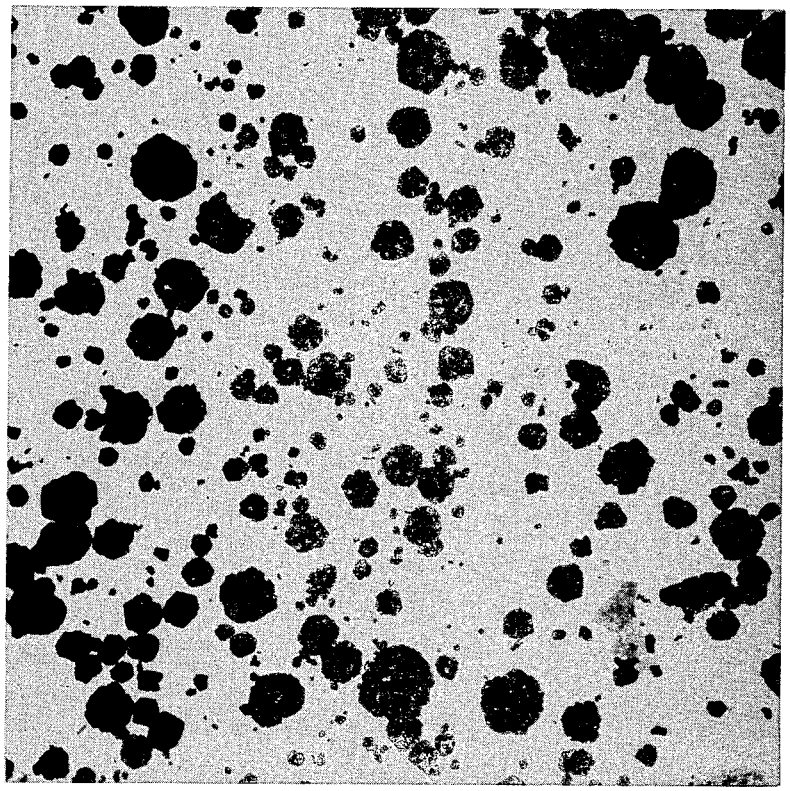
Figure 9:
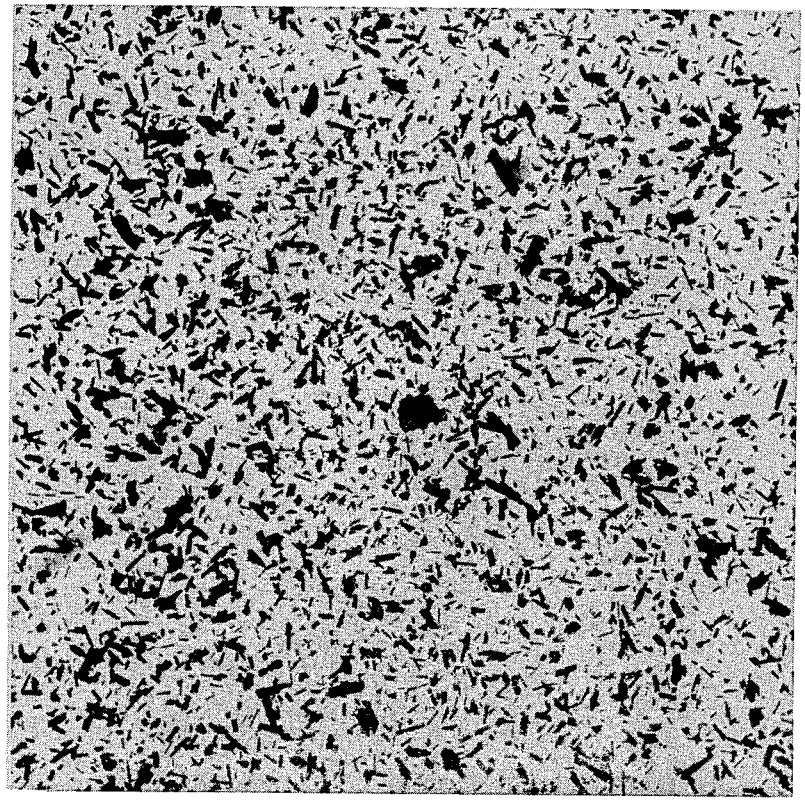

| Example | Treatment | BaS flow, grams/min. | $CO_2$ flow, liters/min. | Percent yield, $BaCO_3$ | $BaCO_3$ surface area, m.²/g. | $CaSO_4$ reactivity | Flowability |
|---|---|---|---|---|---|---|---|
| I | 8% BaS and $CO_2$ at 40° C. | 500 | 3.3 | 40 | 22.0 | 494 | Very good, figure 5. |
| II | 8% BaS and $CO_2$ at 40° C. | 400 | 4.9 | 45 | 18.0 | | Do. |
| III | 8% BaS and $CO_2$ at 30° C. | 300 | 4.5 | 48 | | 411 | Do. |
| IV | 8% BaS and $CO_2$ at 80° C. | 490 | 3.6 | 36 | | 285 | Poor, figure 6. |
| V | 12% BaS and $CO_2$ at 40° C. | 488 | 5.0 | 30 | 14.8 | 353 | Good, figure 7. |
| VI | 18% BaS and $CO_2$ at 60° C. | 445 | 6.1 | 27 | 6.1 | 264 | Poor, figure 8. |
| VII: (1 pass) | 18% BaS and $CO_2$ at 30° C. | 490 | 4.2 | 27 | 11.7 | | Good. |
| (2 passes) | 18% BaS and $CO_2$ at 30° C. | 400 | 4.2 | 31 | 16.8 | 429 | Do. | all of the barium values were precipitated at BaCO₃. After precipitation the slurry was filtered, washed, dried at 140° C., crushed with a mortar and pestle, and dispersed in a Waring Blendor. The barium carbonate had good flowability as evidenced by an electron micrograph (FIGURE 9) which revealed small log-like particles as in Example I having an average ultimate size of about 0.04 (mean diameter) by 0.20 (mean length) micron.

EXAMPLE XI

The conditions of Example X were repeated except that the batch carbonation was conducted at 45° C. with 1.8 liters per minute of $CO_2$ at 25 to 30° C. and atmospheric pressure. Again the precipitated BaCO₃ had good flowability, as evidenced by an electron micrograph which showed small log-like particles having an average ultimate size of about 0.05 (mean diameter) by 0.2 (mean length) micron.

EXAMPLE XII

Figure 10:
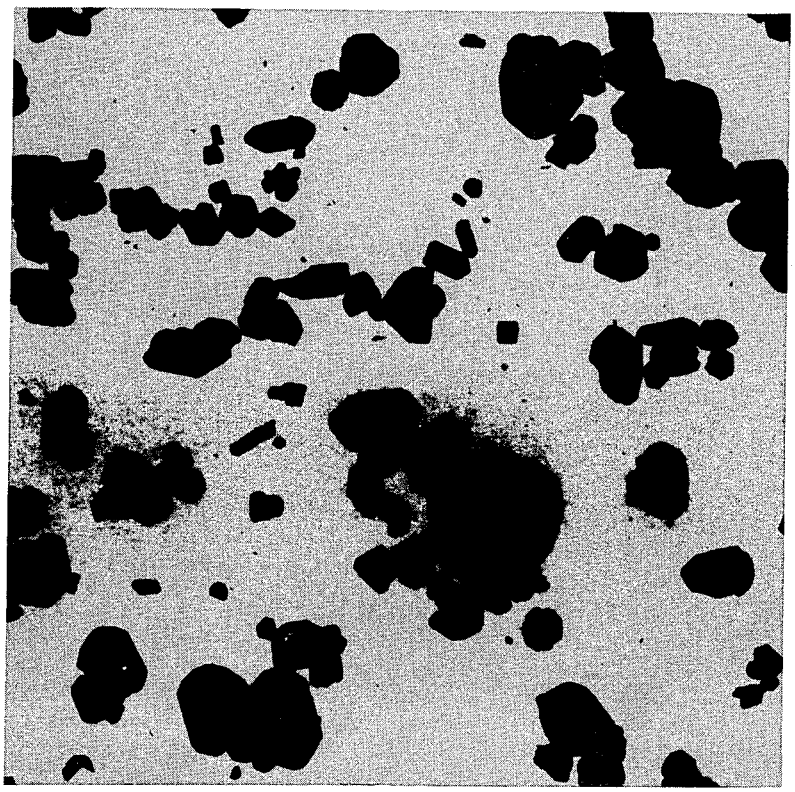

One thousand (1000) grams of seeded slurry were prepared at 80° C., 260 grams per minute BaS flow, and 3.3 liters of $CO_2$ at 25 to 30° C. and atmospheric pressure. The seeded slurry was then batch precipitated at 80° C. in a one liter tank. Carbon dioxide at 3.5 liters per minute, 25 to 30° C. and atmospheric pressure was flowed through a tube extending below the slurry surface such that the $CO_2$ bubbled upwardly through the slurry. The slurry was agitated as in Example XI. The $CO_2$ flow was continued until the pH of the slurry leveled off at 6.0. The slurry was filtered, washed, dried at 140° C., crushed, and dispensed in a Waring Blendor. The barium carbonate had poor flowability as evidenced by an electron micrograph (FIGURE 10) which revealed large non-log shaped particles having an average size of about 0.6 micron.

EXAMPLE XIII

The slurry prepared in Example XII was filtered and one thousand (1000) grams of the unseeded filtrate was batch precipitated exactly as in Example XII. The BaCO₃ had poor flowability. The particle diameter of the product was 3 to 4 microns as measured with a microscope.

EXAMPLE XIV

The conditions of Example X were repeated except that the batch carbonation was conducted with sodium carbonate instead of $CO_2$. The resulting BaCO₃ product has substantially the same particle size, shape, and flow characteristics as the product of Example X. However, no $H_2S$ by-product was obtained, the sulfur values being recovered as $Na_2S$ and $NaHS$.

EXAMPLE XV

The centrifugal pump apparatus of Example I was employed. An aqueous solution of 7 to 10 percent by weight BaS at 30° C. was flowed at 350 grams per minute through pump 4 with $CO_2$ at 25 to 30° C., atmospheric pressure, and 4.1 liters per minute. The resulting solid BaCO₃ seeds in the slurry represented 38 percent by weight of the available barium. The seeds had a surface area of 27.9 square meters per gram and good flowability as evidenced by an electron micrograph which showed small log-like particles, the same size and shape as in Example I.

A portion of the slurry was then batch carbonated at 30° C. with $CO_2$ for 5 hours and 17 minutes at which time the slurry solution contained 0.9 percent by weight of the barium values. The precipitated BaCO₃ had a surface area of 8.9 square meters per gram and comprised log-like particles about twice the size of the pump precipitated seeds.

The remaining 0.9 percent barium was precipitated by the addition of $Na_2CO_3$, the final product having a surface area of 9.9 square meters per gram.

A portion of the slurry was subjected to batch carbonation at 50° C. with $CO_2$. After 6 hours, the slurry solution contained less than 0.1 percent soluble barium. The surface area of the precipitated BaCO₃ was 11.6 square meters per gram. After the addition of $Na_2CO_3$, the BaCO₃ had a surface area of 7.2 square meters per gram.

A portion of the slurry was subjected to batch carbonation at 70° C. with $CO_2$. After 7 hours, the slurry solution contained 0.5 percent by weight soluble barium. The precipitated BaCO₃ had a surface area of 9.2 square meters per gram. After the addition of $Na_2CO_3$, the BaCO₃ had a surface area of 9.9. square meters per gram.

The results of Example XV show the presence of $CO_2$ precipitated pump seeds or crystals of a high surface area prohibit excessive growth of the precipitated BaCO₃ product during batch carbonation at a temperature of 30 to 70° C.

EXAMPLE XVI

The conditions of Example XV were repeated except that the pump seeds were precipitated with an aqueous solution containing 12.1 percent by weight $Na_2CO_3$ instead of $CO_2$, sufficient to precipitate 20 percent by weight of the barium as BaCO₃ seed. The resulting seed had a surface area of 12.0 square meters per gram.

The seeded slurry was then subjected to batch carbonation at 70° C. with $CO_2$ for 6.5 hours thereby resulting in a precipitated BaCO₃ product having a surface area of 1.9 square meters per gram.

The results of Examples XV and XVI show that precipitated seeds of a higher surface area are obtained in a pump with $CO_2$ than with $Na_2CO_3$. Furthermore, the results show that batch carbonation with the smaller $CO_2$ precipitated seeds results in a smaller BaCO₃ product of a higher surface area in comparison with batch carbonation product utilizing $Na_2CO_3$ precipitated seeds.

While the invention has been described by reference to specific details of certain embodiments, it is not intended that the invention be construed as limited to such details except insofar as they appear in the appended claims.

We claim:

1. A process for preparing finely-divided barium carbonate which comprises mixing at temperatures not exceeding 40° C. aqueous barium sulfide having a concentration of from 4 to 20 weight percent and carbon dioxide while maintaining the pH of the resulting aqueous slurry at at least 12 and recovering barium carbonate particles thereby produced.

2. A process according to claim 1 wherein the mixing temperature is from 25° C. to 35° C.

3. A process according to claim 1 wherein the mixing time is less than 60 seconds.

4. A process according to claim 1 wherein the barium carbonate particles produced have a surface area of at least 14.0 square meters per gram.

5. A process according to claim 1 wherein the barium carbonate particles formed have a mean length of from 0.05 to 0.2 micron and a mean diameter of 0.02 to 0.06 micron.

6. A process for preparing barium carbonate which comprises carbonating at temperatures up to 90° C. an aqueous solution of barium sulfide with carbon dioxide and in the presence of barium carbonate seeds until substantially all of the soluble barium values in the aqueous solution of barium sulfide are precipitated as barium carbonate, said barium carbonate seeds having been prepared by mixing at temperatures not exceeding 40° C. aqueous barium sulfide having a concentration of from 4 to 20 weight percent and carbon dioxide while maintaining the pH of the resulting aqueous slurry at at least 12.

7. A process for preparing barium carbonate which comprises mixing in a first carbonation zone at temperatures not exceeding 40° C. and a contact time of less than 60 seconds aqueous barium sulfide having a concentration of from 4 to 20 weight percent and carbon dioxide while maintaining the pH of the resulting aqueous slurry at at least 12, removing an aqueous slurry comprising barium carbonate and unprecipitated soluble barium values from said first zone, passing such aqueous slurry into at least one subsequent carbonation zone wherein such aqueous slurry is contacted with carbon dioxide until at least 95 weight percent of the soluble barium values have been converted to barium carbonate.

8. A process according to claim 7 wherein the barium carbonate product has a structural clay reactivity of less than 10.

9. A process according to claim 7 wherein the barium carbonate product has a calcium sulfate reactivity of at least 100.

10. A process according to claim 7 wherein the temperature of the subsequent carbonation zones does not exceed 40° C.

11. A process for preparing barium carbonate which comprises mixing in a first carbonation zone at a temperature not exceeding 40° C. aqueous barium sulfide having a concentration of from 4 to 20 weight percent and carbon dioxide while maintaining the pH of the resulting aqueous slurry at at least 12, removing an aqueous slurry comprising barium carbonate seeds having a surface area of at least 10 square meters per gram and unprecipitated soluble barium values from said first zone, passing such aqueous slurry into at least one subsequent carbonation zone wherein such aqueous slurry is contacted with carbon dioxide until at least 98 weight percent of the soluble barium values have been converted to barium carbonate.

12. A process for preparing barium carbonate which comprises mixing in a first carbonation zone at a temperature not exceeding 40° C. aqueous barium sulfide having a concentration of from 4 to 20 weight percent and carbon dioxide while maintaining the pH of the resulting aqueous slurry at at least 12, removing an aqueous slurry comprising barium carbonate seeds having a mean length of from 0.05 to 0.15 micron and a mean diameter of 0.02 to 0.06 micron and unprecipitated soluble barium values from said first zone passing such aqueous slurry into at least one subsequent carbonation zone wherein such aqueous slurry is contacted with carbon dioxide until at least 98 weight percent of the soluble barium values have been converted to barium carbonate.

13. A process for preparing finely-divided barium carbonate which comprises mixing at temperatures not exceeding 40° C. aqueous barium sulfide having a concentration of from 4 to 20 weight percent and carbon dioxide for a time sufficient to convert not more than 50 weight percent of the soluble barium values to barium carbonate and recovering barium carbonate particles thereby produced.

References Cited

UNITED STATES PATENTS

| | | | |
|---|---|---|---|
| 1,615,515 | 1/1927 | Marwedel et al. | 23—66 |
| 1,634,338 | 7/1927 | Pierce | 23—66 |
| 2,941,860 | 6/1960 | Annis | 23—66 |
| 3,275,403 | 9/1966 | Mayland | 23—63 X |

FOREIGN PATENTS

| | | |
|---|---|---|
| 211,129 | 8/1957 | Australia. |
| 334,709 | 9/1930 | Great Britain. |
| 562,544 | 7/1944 | Great Britain. |

EARL C. THOMAS, *Primary Examiner.*

G. T. OZAKI, *Assistant Examiner.*

U.S. Cl. X.R.

23—181